Oct. 6, 1931.  E. COOPER  1,826,458
PROPELLER MECHANISM
Filed May 9, 1928
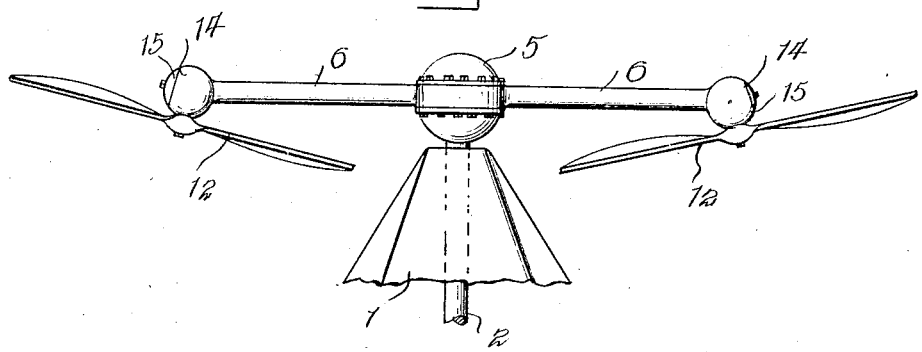
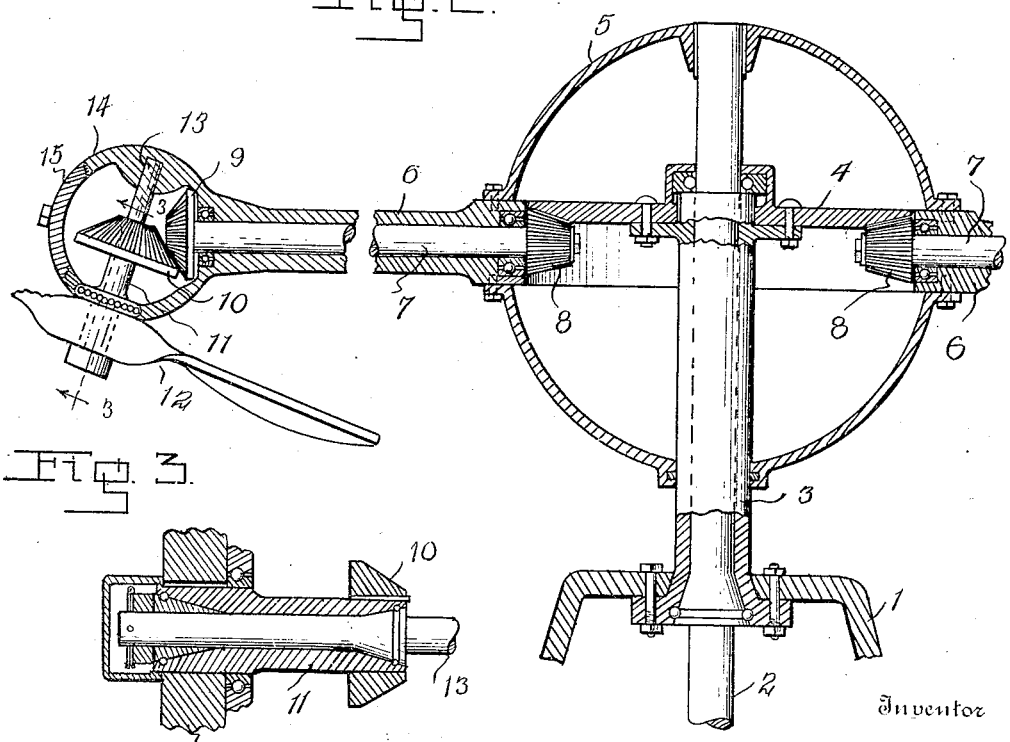
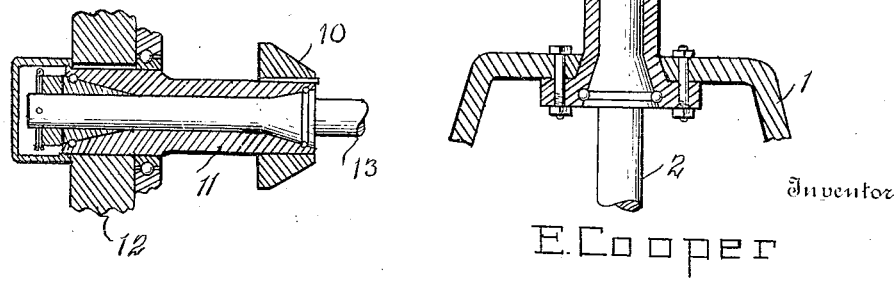
Inventor
E. Cooper
By Lacey & Lacey, Attorney Patented Oct. 6, 1931

1,826,458

UNITED STATES PATENT OFFICE

ERNEST COOPER, OF SHIDLER, OKLAHOMA

PROPELLER MECHANISM

Application filed May 9, 1928. Serial No. 276,445.

This invention relates to propeller means for air craft whereby a quick take-off is assured and the flight maintained at a material saving in fuel and wear on the moving parts.

The invention disposes propellers outwardly from an axis and mounts them in a manner to rotate about their respective axles and travel in a circular path, the axes of the propellers being inclined to the circular path in which the propellers travel.

The invention contemplates a mount which is adapted to receive a rotary movement, propellers thereon to revolve therewith and susceptible of independent rotation, and a planetary gearing and connections to impart the two-fold movement to the propellers.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a top plan view of a propelling mechanism embodying the invention.

Figure 2 is an enlarged fragmentary sectional view.

Figure 3 is an enlarged detail sectional view on the line 3—3 of Figure 2.

Corresponding and like parts are referred to in the following description and designated in the several views of the drawings by like reference characters.

The numeral 1 denotes the body or other framework or structure of a flying machine of any type, and 2 is the drive shaft. A sleeve 3, or other type of bearing, for the drive shaft 2 is bolted, or otherwise made fast, to the supporting structure 1. A gear wheel 4 is keyed, or otherwise secured, to the fixed bearing 3. A mount is connected to the drive shaft 2 in any determinate way so as to rotate therewith and is supported by the bearing 3 on which it is free to rotate. This mount includes a housing 5 and arms 6 projecting outwardly from the housing. A shaft 7 is mounted in each of the arms 6 and a gear wheel 8 fast to the inner end of each of the shafts is in mesh with the teeth of the gear wheel 4. A gear wheel 9 is fast to the outer end of each of the shafts 7 and is in mesh with a companion gear wheel 10 fast to the inner end of a tubular shaft 11. A propeller 12 is fast to the outer end of the tubular shaft 11. An axle 13 supports the tubular shaft 11 and is fast to a housing 14 at the outer end of each of the arms 6. The housing 14 encloses the axle 13 and coacting gears 9 and 10 and access is had thereto through an opening which is normally closed by means of a plate 15.

The mount rotates in a plane perpendicular to the drive shaft 2 and since the gear wheel 4 is fixed and the gear wheels 8 are in mesh therewith it follows that the shafts 7 receive an independent rotary movement which is transmitted to the respective propellers by means of the gearing 9 and 10. The axles 13 are oppositely inclined at an angle approximating seventy-five degrees, hence the propellers are inclined to the plane of travel of the mount. The planetary gearing, (including the sun gear 4 and the planet gears 8, may be of any type best adapted for the particular application of the invention. It is to be understood that suitable anti-friction bearings will be provided to minimize the wear and friction.

A flying machine equipped with propellers embodying the invention is adapted to take-off quickly and to conserve energy, both in the consumption of fuel and in the wear of moving parts.

Having thus described the invention, I claim:

Propelling mechanism comprising a fixed sleeve, a drive shaft mounted in the sleeve and projecting beyond the ends thereof, a housing rotatable on the sleeve and connected with the shaft to rotate therewith, hollow arms projecting outwardly from the housing and revoluble therewith, a fixed gear wheel within the housing secured to the said sleeve, shafts mounted in the hollow arms and geared at their inner ends to the fixed gear wheel, a housing at the outer end of each of the hollow arms, oppositely inclined axles mounted in the housings, tubular shafts loose on the axles and geared at their inner ends to the shafts mounted in the said hollow arms, and propellers secured to the outer ends of the tubular shafts and disposed upon the same side of the arms.

In testimony whereof I affix my signature.

ERNEST COOPER. [L. S.]